US012591622B2

(12) United States Patent
Richardson

(10) Patent No.: US 12,591,622 B2
(45) Date of Patent: Mar. 31, 2026

(54) METHODS AND SYSTEMS FOR MONITORING AND REPLYING TO SOCIAL MEDIA CONTENT

(71) Applicant: National Potato Promotion Board, Denver, CO (US)

(72) Inventor: Blair Richardson, Denver, CO (US)

(73) Assignee: NATIONAL POTATO PROMOTION BOARD, Denver, CO (US)

( * ) Notice: Subject to any disclaimer, the term of this patent is extended or adjusted under 35 U.S.C. 154(b) by 20 days.

(21) Appl. No.: 18/765,038

(22) Filed: Jul. 5, 2024

(65) Prior Publication Data

US 2026/0010571 A1     Jan. 8, 2026

(51) Int. Cl.
| | |
|---|---|
| *G06F 16/906* | (2019.01) |
| *G06F 16/9536* | (2019.01) |
| *G06F 18/2415* | (2023.01) |
| *G06F 40/166* | (2020.01) |
| *G06F 40/279* | (2020.01) |
| *G06F 40/30* | (2020.01) |
| *G06F 40/40* | (2020.01) |

(52) U.S. Cl.
CPC ........ *G06F 16/906* (2019.01); *G06F 16/9536* (2019.01); *G06F 18/2415* (2023.01); *G06F 40/166* (2020.01); *G06F 40/279* (2020.01); *G06F 40/30* (2020.01); *G06F 40/40* (2020.01)

(58) Field of Classification Search
CPC .............. G06F 16/906; G06F 16/9536; G06F 18/2415; G06F 40/166; G06F 40/279; G06F 40/40; G06F 40/30
USPC ....................................................... 707/740
See application file for complete search history.

(56) References Cited

U.S. PATENT DOCUMENTS

| | | | | |
|---|---|---|---|---|
| 8,693,643 B2 * | 4/2014 | Mikan | .................. | G06Q 10/107 |
| | | | | 379/70 |
| 8,918,468 B1 * | 12/2014 | Fisher | ................. | G06F 16/3344 |
| | | | | 709/224 |
| 10,162,884 B2 * | 12/2018 | Thirugnanasundaram | .................. | |
| | | | | G06Q 10/10 |

(Continued)

OTHER PUBLICATIONS

Rodrigues, Anisha P., et al., "A new big data approach for topic classification and sentiment analysis of Twitter data", Evolutionary Intelligence, Springer Nature Link, vol. 15, Jun. 2022, pp. 877-887.*

(Continued)

*Primary Examiner* — Robert Stevens
(74) *Attorney, Agent, or Firm* — Sheridan Ross P.C.

(57) ABSTRACT

Embodiments of the present disclosure are directed to monitoring and responding to social media content according to one embodiment of the present disclosure. Monitoring and responding to social media content can comprise reading content of a social media source and identifying a sub-set of content from the content of the social media source for response based on a model defining content for which a response is to be prepared. One or more natural language responses to the identified sub-set of content can be generated based on a model defining responses and a knowledge base of information. Each natural language response can comprise factual information from the knowledge base of information. The generated one or more natural language responses can be submitted to the social media source in response to the identified sub-set of content.

18 Claims, 7 Drawing Sheets

(56) References Cited

U.S. PATENT DOCUMENTS

| | | | | |
|---|---|---|---|---|
| 10,452,671 | B2 * | 10/2019 | Liu | G06F 40/30 |
| 10,778,838 | B2 * | 9/2020 | Gorny | H04M 3/5315 |
| 11,010,436 | B1 * | 5/2021 | Peng | G10L 15/07 |
| 2011/0288897 | A1 * | 11/2011 | Erhart | G06F 16/9536 |
| | | | | 709/204 |
| 2014/0379729 | A1 * | 12/2014 | Savage | G06Q 10/10 |
| | | | | 707/748 |
| 2016/0140619 | A1 | 5/2016 | Soni et al. | |
| 2018/0075335 | A1 * | 3/2018 | Braz | G06F 16/24522 |
| 2021/0392230 | A1 * | 12/2021 | Shah | H04M 3/5175 |
| 2022/0012296 | A1 * | 1/2022 | Marey | G06F 40/30 |
| 2023/0267558 | A1 | 8/2023 | Adibowo | |
| 2023/0274086 | A1 | 8/2023 | Tunstall-Pedoe et al. | |
| 2023/0342864 | A1 * | 10/2023 | Bagade | G06F 40/279 |
| 2024/0193524 | A1 | 6/2024 | Malik et al. | |

OTHER PUBLICATIONS

Kannan, Anjuli, et al., "Smart Reply: Automated Response Suggestion for Email", KDD '16, San Francisco, CA, Aug. 13-17, 2016 , pp. 955-964.*

IEEE 100: The Authoritative Dictionary of IEEE Standards Terms, 7th Edition, The Institute of Electrical and Electronics Engineering, Inc., New York, NY, Dec. 2000, p. 701.*

Roget's II: The New Thesaurus, 3rd Edition, Houghton Mifflin Co., Boston, MA, © 1995, p. 644.*

Srikanth, Maya, et al., "Dynamic Social Media Monitoring for Fast-Evolving Online Discussions", KDD '21: Proc. of the 27th ACM SIGKDD Conf on Knowledge Discovery and Data Mining, Virtual Event, Singapore, Aug. 14-18, 2021, pp. 3576-3584.*

Grimme, Christian, et al., "New Automation for Social Bots: From Trivial Behavior to AI-Powered Communication", MISDOOM 2022, LNCS 13545, Boise, ID, Oct. 11-12, 2022, In: Spezzano, F., Amaral, A., Ceolin, D., Fazio, L., Serra, E. (eds), Disinformation in Open Online Media, pp. 79-99.*

International Search Report and Written Opinion for International (PCT) Patent Application No. PCT/US2025/029979, dated Jul. 21, 2025 16 pages.

* cited by examiner

METHODS AND SYSTEMS FOR MONITORING AND REPLYING TO SOCIAL MEDIA CONTENT

FIELD OF THE DISCLOSURE

Embodiments of the present disclosure relate generally to methods and systems for online communications and more particularly to methods and systems for monitoring and responding to social media content.

Figure 1:
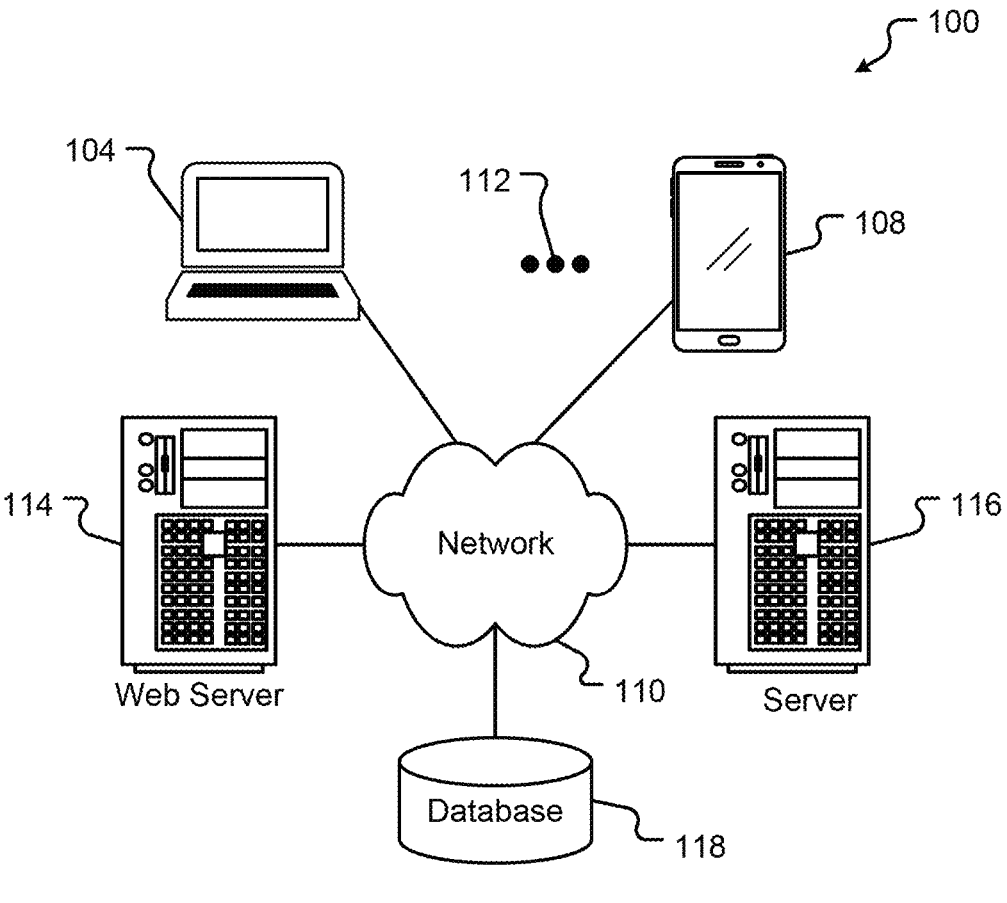
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be trans-mitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodi-ment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal proces-sor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodol-ogy illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple micro-processors), memory, nonvolatile storage, input devices, and output devices. Furthermore, alternative software imple-mentations including, but not limited to, distributed process-ing or component/object distributed processing, parallel processing, or virtual machine processing can also be con-structed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile proces-sors, ARM® Cortex™-M processors, ARM® Cortex-A and ARM926EJ-S™ processors, other industry-equivalent pro-cessors, and may perform computational functions using any known or future-developed standard, instruction set, librar-ies, and/or architecture.

In yet another embodiment, the disclosed methods may be readily implemented in conjunction with software using object or object-oriented software development environ-ments that provide portable source code that can be used on a variety of computer or workstation platforms. Alterna-tively, the disclosed system may be implemented partially or fully in hardware using standard logic circuits or Very Large-Scale Integration (VLSI) design. Whether software or hardware is used to implement the systems in accordance with this disclosure is dependent on the speed and/or effi-ciency requirements of the system, the particular function, and the particular software or hardware systems or micro-processor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configura-tions are not limited to such standards and protocols. Other similar standards and protocols not mentioned herein are in existence and are considered to be included in the present disclosure. Moreover, the standards and protocols men-tioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
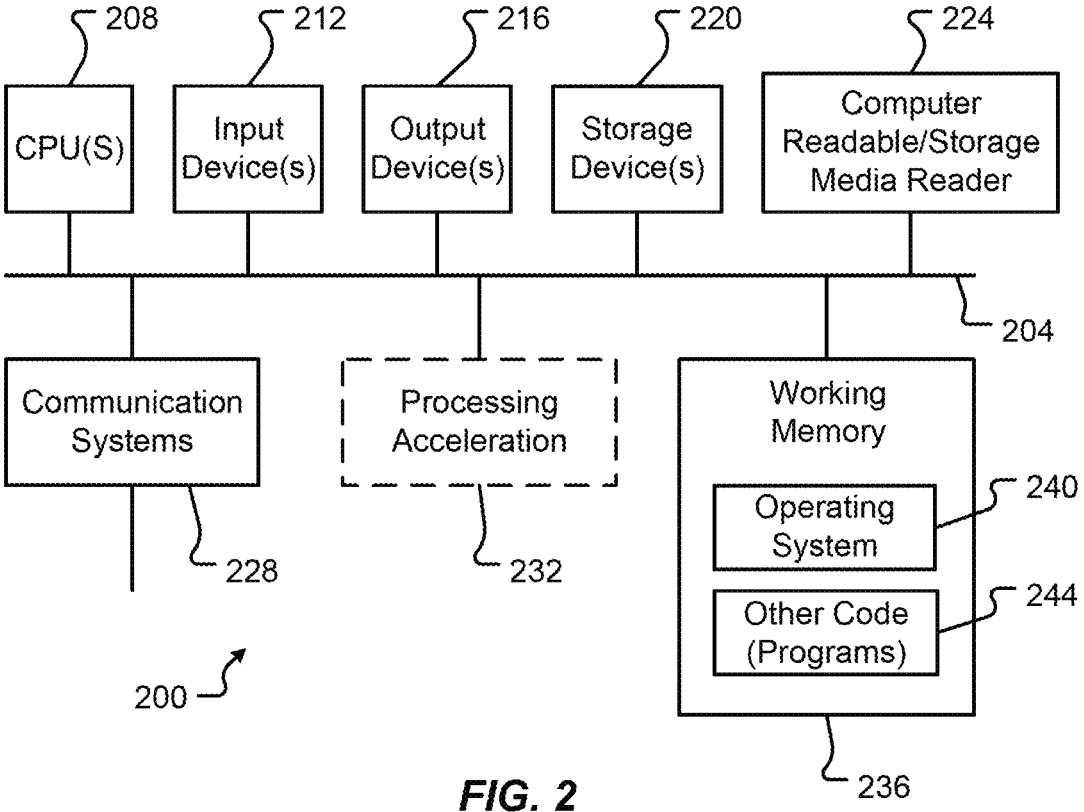
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments of the present disclosure are directed to methods and systems for monitoring and responding to social media content. Generally speaking, embodiments utilize Artificial Intelligence (AI) to identify social media posts or other content related to a particular topic, e.g., a particular product or service, a particular person, company, or other entity, etc., and decide whether to respond to the post. If a decision is made to respond, the AI system(s) can generate an appropriate, natural language response and post the response as a reply to the original post. According to one embodiment, the reply can include factual information, perhaps including a link to a source of the information to support or correct statements made in the original post. For example, an entity providing or related to a particular product or service can utilize embodiments described herein to monitor social media posts for those related to the provided good or service. If the post is found to be negative toward the product or service, embodiments described herein can provide a response with factual information correcting or countering the original past. Similarly, if a post is found to be positive toward the product or service, embodiment described herein can provide a response supportive of or elaborating on the original post.

Figure 3:
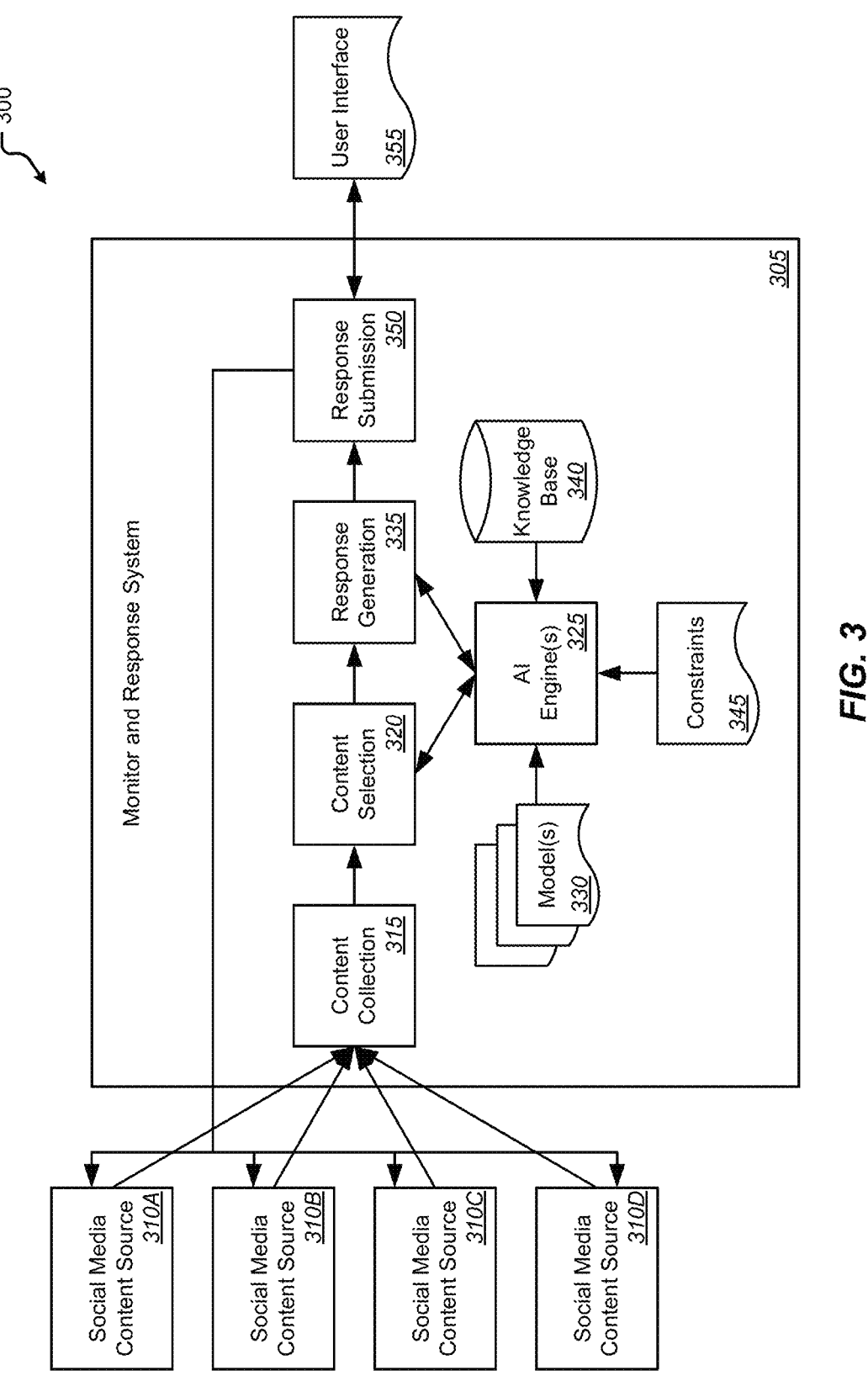
FIG. 3 is a block diagram illustrating an exemplary social media content monitor and response environment according to one embodiment of the present disclosure.

FIG. 3 is a block diagram illustrating an exemplary social media content monitor and response environment according to one embodiment of the present disclosure. As illustrated in this example, the environment 300 can comprise a monitor and response system 305. The monitor and response system 305 can comprise any one or more servers and/or other computing devices as described above. The monitor and response system can be coupled to a communications network (not shown here). The communications network can comprise any one or more wired and/or wireless, local-area and/or wide area networks as described above including, but not limited to, the Internet.

The environment 300 can further comprise any number of social media content sources 310A-310D also coupled with the communications network (not shown here). As known in the art, the social media content sources 310A-310D can comprise various platforms through which users can post or publish content, share that content with others, exchange messages, etc. The content posted can comprise text-based messages, graphics, audio clips, video clips, etc.

As introduced above, the monitor and response system 305 can monitor the content posted or published on any one or more of the social media content sources 310A-310D, decide whether to respond to any of the content, generate responses, and post those responses to the original content on the social media content sources 310A-310D. More specifically, the monitor and response system can comprise a content collection module 315 that can access any one or more of the social media content sources 310A-310D, e.g., through an Application Program Interface (API) provided by the social media content source as known in the art, and read the content of the social media source periodically or on demand.

The monitor and response system 305 can further comprise a content selection module 320 which can identify a sub-set of content from the content read from the social media source for response. The sub-set of content can be identified by the content selection module 320 utilizing one or more AI engines 325 and based on a model 330 defining content for which a response is to be prepared. More specifically, identifying the sub-set of content from the content of the social media source can comprise determining whether a post in the content is directed to a topic of interest. This determination can be based on keywords in each post of the plurality of posts in the content of the social media source and a set of predefined keywords associated with a topic of interest.

In response to determining a post contains any of the set of predefined keywords associated with the topic of interest, the content selection module 320 can group together each selected post into one of a plurality of narratives. For example, the topic of interest can comprise a particular product, entity, or other topic. Each narrative can comprise a cluster of posts having a common theme and can be grouped by the content selection module 320 and/or AI engine(s) 325 using various AI clustering methods as known in the art.

Each narrative of the plurality of narratives can then be classified by the content selection module 320 into one of a plurality of categories based on semantics of each narrative. For example, the categories can characterize the posts in the narrative as positive towards the topic of interest, neutral toward the topic of interest, or negative toward the topic of interest. Classification of the narratives into such categories can be performed, for example, based on a semantic analysis of content of posts in each narrative using various methods as known in the art.

A relevance of each narrative to the topic of interest can be rated by the content selection module 320. Rating the relevance of each narrative to the topic of interest can be based on a predefined set of sub-topics of interest and keywords related to the set of sub-topics appearing in posts in the content of each narrative. For example, the sub-topics can comprise health, safety, reputation, or other sub-topics related to the topic of interest. In some cases, rating the relevance of each narrative to the topic of interest can be further based on a level of social media engagement for posts in the content of each narrative, e.g., a number of likes, a number times the post has been viewed and/or shared, and/or other indications of interaction with the post by users of the social media source.

The content selection module 320 can then select one or more narratives of the plurality of narratives as the sub-set of content for response based on the classified category of the one or more narratives and the rating of relevance of the one or more narratives. For example, one or more narratives can be selected based on the relevance of the narratives exceeding a predefined threshold for the relevance. Additionally, or alternatively, the narratives may be selected based on being either positive, negative, etc. In some cases, the narratives may additionally, or alternatively, be selected based on a received input indicating a user selection.

The monitor and response system 305 can further comprise a response generation module 335 which can generate one or more natural language responses to the identified sub-set of content. The responses can be generated utilizing one or more AI engines 325 and based on a model 330 defining responses and a knowledge base of information 340. Each natural language response can comprise factual information from the knowledge base of information 340. Generating the one or more natural language responses to the identified sub-set of content based on a model 330 defining responses and the knowledge base of information 340 can comprise applying a LLM generative AI to generate a response to each narrative of the plurality of narratives. Generating the one or more natural language responses to the identified sub-set of content based on a model 330 defining responses and the knowledge base 340 of information can further comprise adding a hyperlink to a source of information in the knowledge base 340. A set of constraints 340 can be applied by the response generation module 335 to the one or more natural language responses. The set of constraints 340 can define content and tone for the one or more natural language responses. For example, the constraints 340 can define prohibited words, phrases, and/or statements or can define characteristics of prohibited words, phrases, and/or statements. Additionally, or alternatively, the constraints can define preferred words, phrases, and/or statements.

The generated one or more natural language responses can be submitted to the social media source in response to the identified sub-set of content by a response submission module 350. Submitting the generated one or more natural language responses to the social media source in response to the identified sub-set of content can comprise determining whether to review the generated response. This determination may be made by default, based on a setting or selection, or other factors.

In response to determining to review the generated one or more natural language response, the generated one or more natural language responses can be presented by the response submission module 350 in a user interface 355 for review by a user. Once presented further determinations can be made by the response submission module 350 as to whether to accept or edit a selected generated response of the generated one or more natural language responses, e.g., based on input from the user through the user interface 355. In response to determining to accept the selected generated response as is, the selected generated response can be published by the response submission module 350 to each post of the narrative of the plurality of narratives for which the response was generated and the models used to generate the response can be trained on the selection by a training module (not shown here) of the monitor and response system 305.

In response to determining to not accept the response as generated but rather determining to edit the selected generated response, one or more edits to the selected generated response can be received by the response submission module 350 through the user interface 355 and the selected generated response can be updated by the response submission module 350 with the received edits. The updated selected generated response can then be published by the response submission module 350 to each post of the narrative of the plurality of narratives for which the response was generated and the models used to generate the response can be trained by the training module (not shown here) on the updates made to the response.

In response to determining to not accept the response as generated and determining to not edit the generated response, a further determination can be made by the response submission module 350 as to whether to regenerate the selected generated response. In response to determining to regenerated the selected generated response, a response for the narrative for which the selected generated response was initially generated can be regenerated by the response generation module 335.

Figure 4:
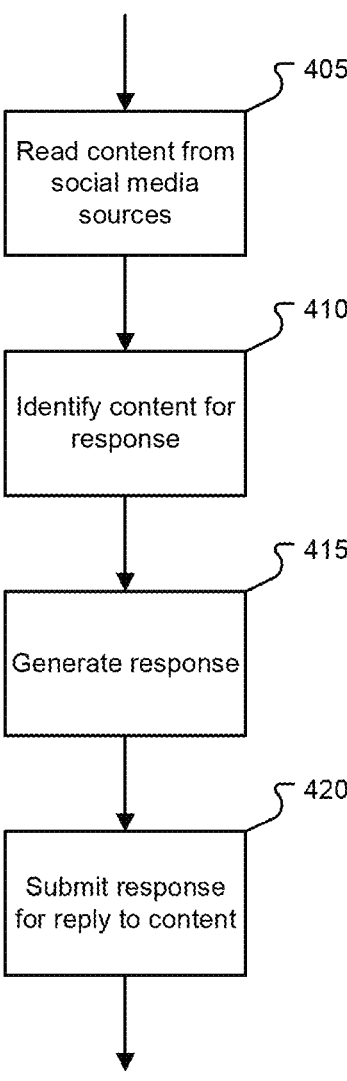
FIG. 4 is a flowchart illustrating an exemplary process for monitoring and responding to social media content according to one embodiment of the present disclosure.

FIG. 4 is a flowchart illustrating an exemplary process for monitoring and responding to social media content according to one embodiment of the present disclosure. As illustrated in this example, monitoring and responding to social media content can comprise reading 405 content of a social media source. As noted above, the content can comprise a plurality of posts to the social media source by users of the social media source.

A sub-set of content from the content of the social media source can be identified 410 for response. The sub-set of content can be identified 410 based on a model defining content for which a response is to be prepared. Additional details of an exemplary process for identifying 410 content for response will be described below with reference to FIG. 5.

One or more natural language responses to the identified sub-set of content can be generated 415. The responses can be generated 415 based on a model defining responses and a knowledge base of information. Each natural language response can comprise factual information from the knowledge base of information. Additional details of an exemplary process for generating 415 natural language response will be described below with reference to FIG. 6.

The generated one or more natural language responses can be submitted 420 to the social media source in response to the identified sub-set of content. Additional details of an exemplary process for submitting 420 the natural language response to the social media source will be described below with reference to FIG. 7.

Figure 5:
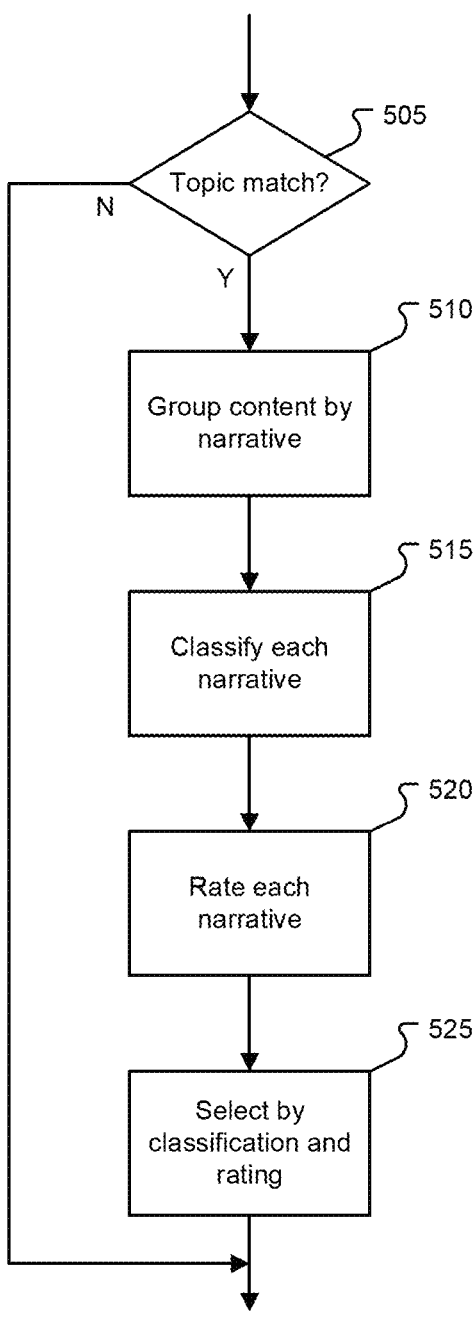
FIG. 5 is a flowchart illustrating additional details of an exemplary process for identifying content for response according to one embodiment of the present disclosure.

FIG. 5 is a flowchart illustrating additional details of an exemplary process for identifying content for response according to one embodiment of the present disclosure. As illustrated in this example, identifying the sub-set of content from the content of the social media source can comprise determining 505 whether a post in the content is directed to a topic of interest. This determination 505 can be based on keywords in each post of the plurality of posts in the content of the social media source and a set of predefined keywords associated with a topic of interest.

In response to determining 505 a post contains any of the set of predefined keywords associated with the topic of interest, each post of the plurality of posts in the content of the social media source found to contains any of the set of predefined keywords associated with a topic of interest can be grouped 510 into one of a plurality of narratives. For example, the topic of interest can comprise a particular product, entity, or other topic Each narrative can comprise a cluster of posts having a common theme and can be grouped 510 using various AI clustering methods as known in the art.

Each narrative of the plurality of narratives can then be classified 515 into one of a plurality of categories based on semantics of each narrative. For example, the categories can characterize the posts in the narrative as positive towards the topic of interest, neutral toward the topic of interest, or negative toward the topic of interest. Classification of the narratives into such categories can be performed, for example, based on a semantic analysis of content of posts in each narrative using various methods as known in the art.

A relevance of each narrative to the topic of interest can be rated 520. Rating 520 the relevance of each narrative to the topic of interest can be based on a predefined set of sub-topics of interest and keywords related to the set of sub-topics appearing in posts in the content of each narrative. For example, the sub-topics can comprise health, safety, reputation, or other sub-topics related to the topic of interest. In some cases, rating the relevance of each narrative to the topic of interest can be further based on a level of social media engagement for posts in the content of each narrative, e.g., a number of likes, a number times the post has been viewed and/or shared, and/or other indications of interaction with the post by users of the social media source.

One or more narratives of the plurality of narratives can be selected 525 as the sub-set of content from the content of the social media source for response based on the classified category of the one or more narratives and the rating of relevance of the one or more narratives. For example, one or more narratives can be selected 525 based on the relevance of the narratives exceeding a predefined threshold for the relevance. Additionally, or alternatively, the narratives may be selected 525 based on being either positive, negative, etc. In some cases, the narratives may additionally, or alternatively, be selected 525 based on a received input indicating a user selection.

Figure 6:
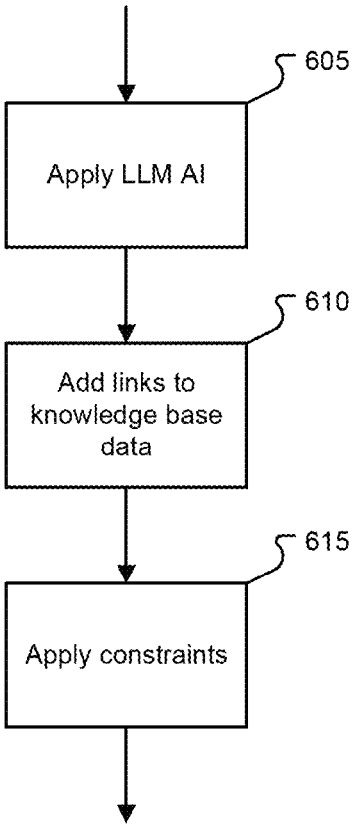
FIG. 6 is a flowchart illustrating additional details of an exemplary process for generating a response to identified content according to one embodiment of the present disclosure.

FIG. 6 is a flowchart illustrating additional details of an exemplary process for generating a response to identified content according to one embodiment of the present disclosure. As illustrated in this example, generating the one or more natural language responses to the identified sub-set of content based on a model defining responses and the knowledge base of information can comprise applying 605 a LLM generative AI to generate a response to each narrative of the plurality of narratives. Generating the one or more natural language responses to the identified sub-set of content based on a model defining responses and the knowledge base of information can further comprise adding 610 a hyperlink to a source of information in the knowledge base. A set of constraints can be applied 615 to the one or more natural language responses. The set of constraints can define content and tone for the one or more natural language responses. For example, the constraints can define prohibited words, phrases, and/or statements of can define characteristics of prohibited words, phrases, and/or statements. Additionally, or alternatively, the constraints can define preferred words, phrases, and/or statements.

Figure 7:
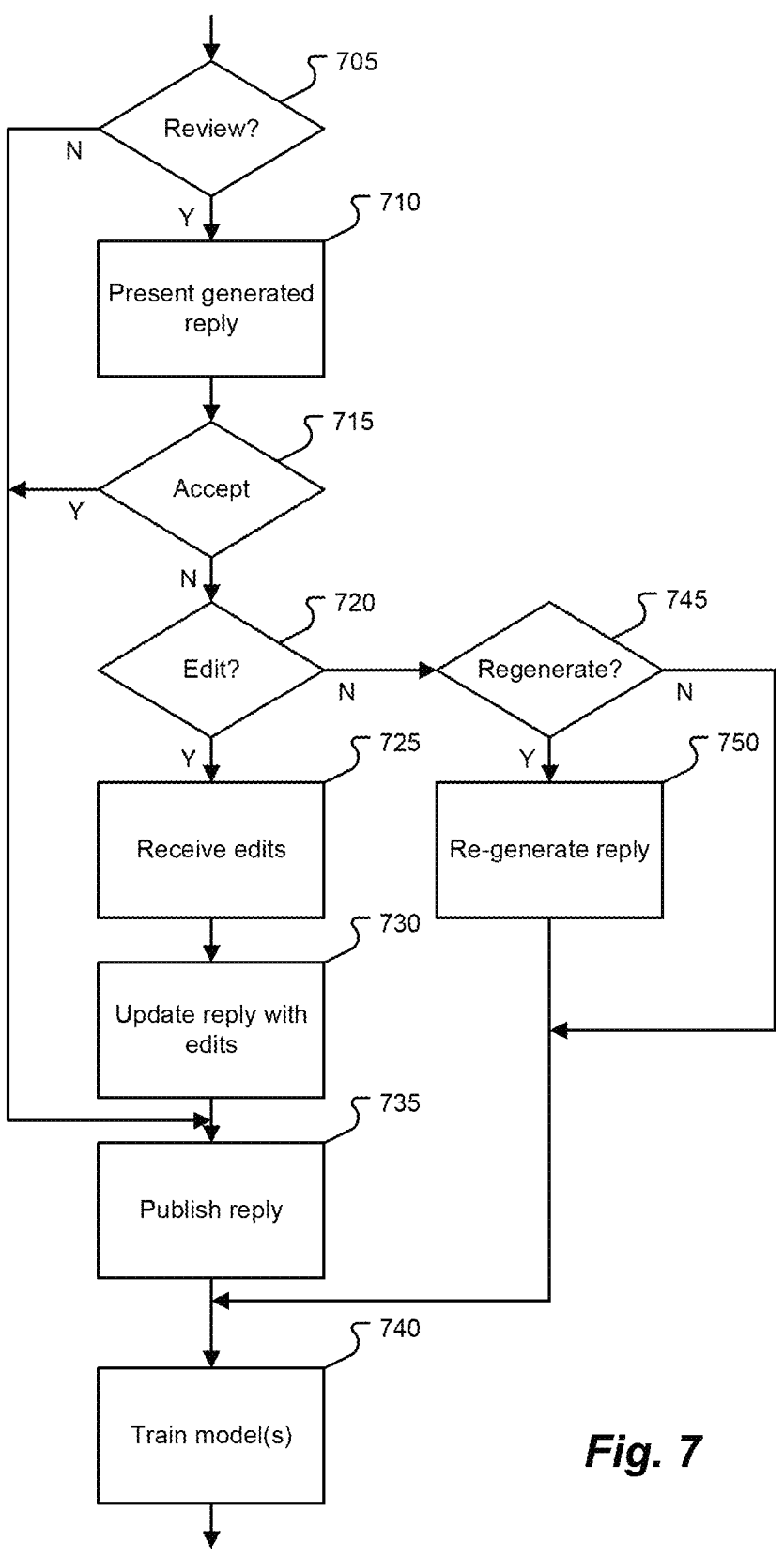
FIG. 7 is a flowchart illustrating additional details of an exemplary process for submitting a generated response to identified content according to one embodiment of the present disclosure.

FIG. 7 is a flowchart illustrating additional details of an exemplary process for submitting a generated response to identified content according to one embodiment of the present disclosure. As illustrated in this example, submitting the generated one or more natural language responses to the social media source in response to the identified sub-set of content can comprise determining 705 whether to review the generated response. This determination 705 may be made by default, based on a setting or selection, or other factors.

In response to determining 705 to review the generated one or more natural language response, the generated one or more natural language responses can be presented 710 in a user interface for review by a user. Once presented 710 further determinations 715 and 720 can be made as to whether to accept or edit a selected generated response of the generated one or more natural language responses. In response to determining 715 to accept the selected generated response as is, the selected generated response can be published 735 to each post of the narrative of the plurality of narratives for which the response was generated and the models used to generate the response can be trained 740 on the selection.

In response to determining 715 to not accept the response as generated but rather determining 720 to edit the selected generated response, one or more edits to the selected generated response can be received 725 through the user interface and the selected generated response can be updated 730 with the received edits. The updated selected generated response can then be published 735 to each post of the narrative of the plurality of narratives for which the response was generated and the models used to generate the response can be trained 740 on the updates made to the response.

In response to determining 715 to not accept the response as generated and determining 720 to not edit the generated response, a further determination 745 can be made as to whether to regenerate the selected generated response. In response to determining 745 to regenerated the selected generated response, a response for the narrative for which the selected generated response was initially generated can be regenerated 750.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving case and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for monitoring and responding to social media content, the method comprising:

reading, by a processor of a monitor and response system, content of a social media source, wherein the content comprises a plurality of posts to the social media source by users of the social media source;

identifying, by the processor of the monitor and response system, a sub-set of content from the content of the social media source for response based on a model defining content for which a response is to be prepared;

generating, by the processor of the monitor and response system, one or more natural language responses to the identified sub-set of content based on a model defining responses and a knowledge base of information, wherein each natural language response comprises factual information from the knowledge base of information; and submitting, by the processor of the monitor and response system, the generated one or more natural language responses to the social media source in response to the identified sub-set of content, wherein submitting the generated one or more natural language responses to the social media source in response to the identified sub-set of content comprises presenting the generated one or more natural language responses in a user interface, determining whether to accept or edit a selected generated response of the generated one or more natural language responses, in response to determining to accept the selected generated response, publishing the selected generated response to each post of the narrative of the plurality of narratives for which the response was generated, and in response to determining to edit the selected generated response, receiving one or more edits to the selected generated response, updating the selected generated response with the received edits, and publishing the updated selected generated response to each post of the narrative of the plurality of narratives for which the response was generated.

2. The method of claim 1, wherein identifying the sub-set of content from the content of the social media source comprises determining, based on keywords in each post of the plurality of posts in the content of the social media source, whether a post contains any of a set of predefined keywords associated with a topic of interest.

3. The method of claim 2, wherein identifying the sub-set of content from the content of the social media source further comprises:

grouping each post of the plurality of posts in the content of the social media source found to contain any of the set of predefined keywords associated with a topic of interest into one of a plurality of narratives, wherein each narrative comprises a cluster of posts having a common theme;

classifying each narrative of the plurality of narratives into one of a plurality of categories based on semantics of each narrative;

rating a relevance of each narrative to the topic of interest; and selecting one or more narratives of the plurality of narratives as the sub-set of content from the content of the social media source for response based on the classified category of the one or more narratives and the rating of relevance of the one or more narratives.

4. The method of claim 3, wherein rating the relevance of each narrative to the topic of interest is further based on a predefined set of sub-topics of interest and keywords related to the set of sub-topics appearing in posts in the content of each narrative.

5. The method of claim 4, wherein rating the relevance of each narrative to the topic of interest is further based on a level of social media engagement for posts in the content of each narrative.

6. The method of claim 3, wherein generating the one or more natural language responses to the identified sub-set of content based on a model defining responses and the knowledge base of information comprises using a Large Language Model (LLM) generative Artificial Intelligence (AI) to generate a response to each narrative of the plurality of narratives.

7. The method of claim 6, wherein generating the one or more natural language responses to the identified sub-set of content based on a model defining responses and the knowledge base of information further comprises adding a hyperlink to a source of information in the knowledge base.

8. The method of claim 6, wherein generating the one or more natural language responses to the identified sub-set of content based on a model defining responses and the knowledge base of information comprises applying a set of constraints to the one or more natural language responses, wherein the set of constraints define content and tone for the one or more natural language responses.

9. The method of claim 1, wherein submitting the generated one or more natural language responses to the social media source in response to the identified sub-set of content further comprises:

in response to determining to not accept or edit the selected generated response, further determining whether to regenerate the selected generated response; and in response to determining to regenerated the selected generated response, regenerating a response for the narrative for which the selected generated response was generated.

10. A system comprising:

a processor; and a memory coupled with and readable by the processor and storing therein a set of instructions which, when executed by the processor, causes the processor to:

read content of a social media source, wherein the content comprises a plurality of posts to the social media source by users of the social media source;

identify a sub-set of content from the content of the social media source for response based on a model defining content for which a response is to be prepared;

generate one or more natural language responses to the identified sub-set of content based on a model defining responses and a knowledge base of information, wherein each natural language response comprises factual information from the knowledge base of information; and submit the generated one or more natural language responses to the social media source in response to the identified sub-set of content, wherein submitting the generated one or more natural language responses to the social media source in response to the identified sub-set of content comprises presenting the generated one or more natural language responses in a user interface, determining whether to accept or edit a selected generated response of the generated one or more natural language responses, in response to determining to accept the selected generated response, publishing the selected generated response to each post of the narrative of the plurality of narratives for which the response was generated, and in response to determining to edit the selected generated response, receiving one or more edits to the selected generated response, updating the selected generated response with the received edits, and publishing the updated selected generated response to each post of the narrative of the plurality of narratives for which the response was generated.

11. The system of claim 10, wherein identifying the sub-set of content from the content of the social media source comprises determining, based on keywords in each post of the plurality of posts in the content of the social media source, whether a post contains any of a set of predefined keywords associated with a topic of interest.

12. The system of claim 11, wherein identifying the sub-set of content from the content of the social media source further comprises:

grouping each post of the plurality of posts in the content of the social media source found to contain any of the set of predefined keywords associated with a topic of interest into one of a plurality of narratives, wherein each narrative comprises a cluster of posts having a common theme;

classifying each narrative of the plurality of narratives into one of a plurality of categories based on semantics of each narrative;

rating a relevance of each narrative to the topic of interest; and selecting one or more narratives of the plurality of narratives as the sub-set of content from the content of the social media source for response based on the classified category of the one or more narratives and the rating of relevance of the one or more narratives.

13. The system of claim 12, wherein rating the relevance of each narrative to the topic of interest is further based on a predefined set of sub-topics of interest and keywords related to the set of sub-topics appearing in posts in the content of each narrative.

14. The system of claim 13, wherein rating the relevance of each narrative to the topic of interest is further based on a level of social media engagement for posts in the content of each narrative.

15. The system of claim 12, wherein generating the one or more natural language responses to the identified sub-set of content based on a model defining responses and the knowledge base of information comprises using a Large Language Model (LLM) generative Artificial Intelligence (AI) to generate a response to each narrative of the plurality of narratives.

16. The system of claim 15, wherein generating the one or more natural language responses to the identified sub-set of content based on a model defining responses and the knowledge base of information further comprises adding a hyperlink to a source of information in the knowledge base.

17. The system of claim 15, wherein generating the one or more natural language responses to the identified sub-set of content based on a model defining responses and the knowledge base of information comprises applying a set of constraints to the one or more natural language responses, wherein the set of constraints define content and tone for the one or more natural language responses.

18. The system of claim 10, wherein submitting the generated one or more natural language responses to the social media source in response to the identified sub-set of content further comprises:

in response to determining to not accept or edit the selected generated response, further determining whether to regenerate the selected generated response; and in response to determining to regenerated the selected generated response, regenerating a response for the narrative for which the selected generated response was generated.

* * * * *